Jan. 29, 1963
R. E. TRUDINSKI
3,075,428
SHEET LOCATING AND MASKING APPARATUS
Filed May 4, 1960
3 Sheets-Sheet 1
FIG. I.
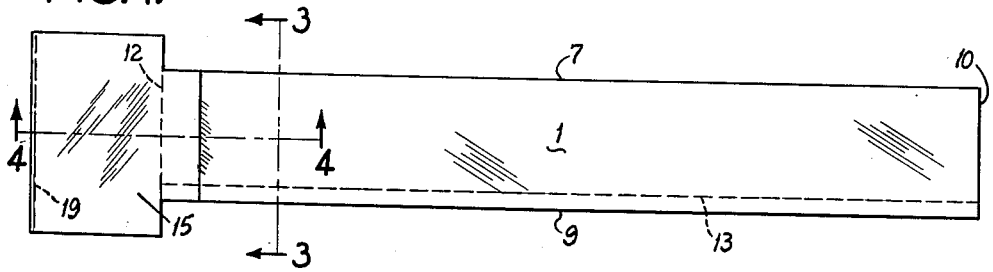
FIG. 2.
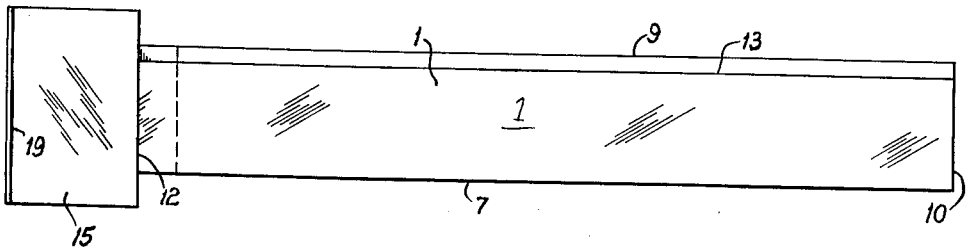
FIG. 4.
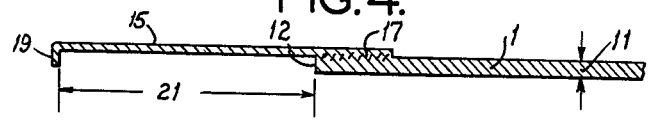
FIG. 3.
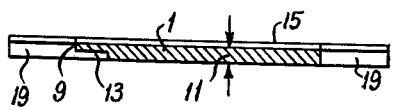
FIG. 7.
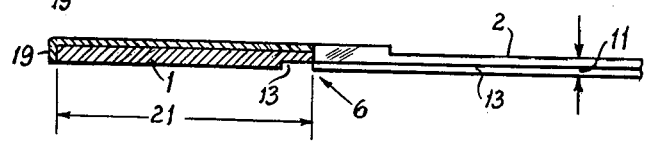
FIG. 8.
Richard E. Trudinski,
Inventor.
Koenig and Pope,
Attorneys.

Jan. 29, 1963    R. E. TRUDINSKI    3,075,428
SHEET LOCATING AND MASKING APPARATUS
Filed May 4, 1960    3 Sheets-Sheet 2
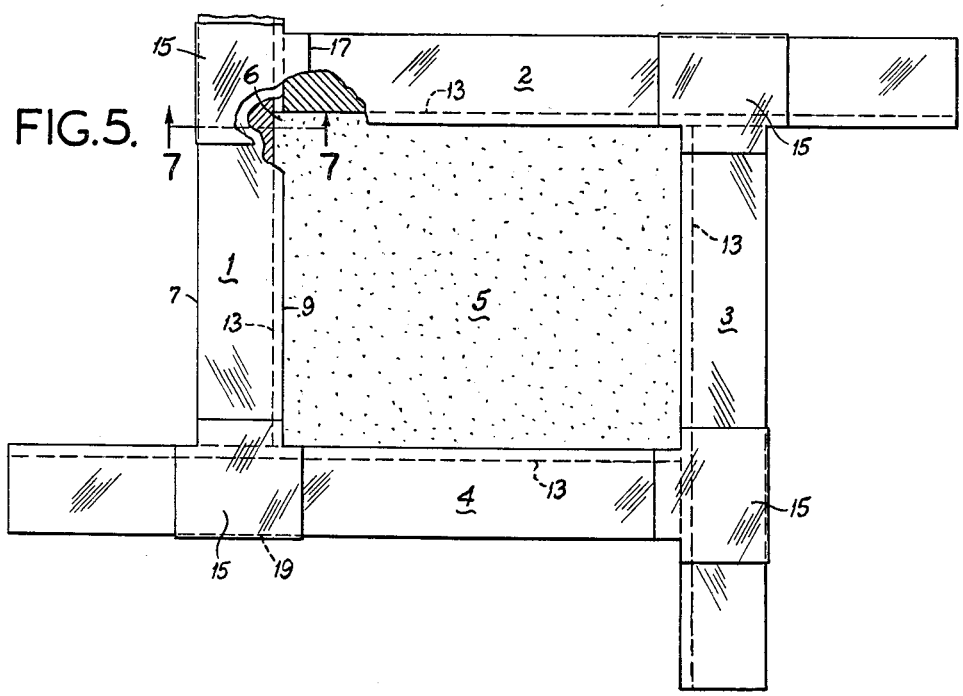
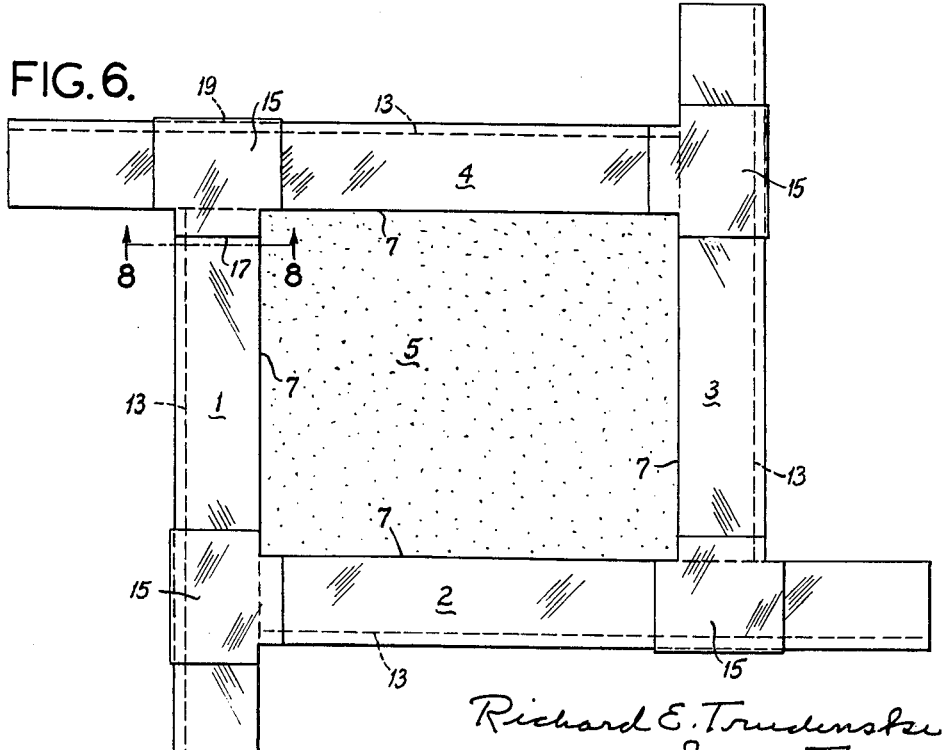

Jan. 29, 1963 R. E. TRUDINSKI 3,075,428
SHEET LOCATING AND MASKING APPARATUS
Filed May 4, 1960 3 Sheets-Sheet 3

Richard E. Trudinski
Inventor
Koenig and Pope
Attorneys

United States Patent Office 3,075,428
Patented Jan. 29, 1963

3,075,428
SHEET LOCATING AND MASKING APPARATUS
Richard E. Trudinski, St. Louis County, Mo.
(678 Bellswort, Lemay, Mo.)
Filed May 4, 1960, Ser. No. 26,757
1 Claim. (Cl. 88—24)

This invention relates to sheet locating and masking apparatus, and with regard to certain more specific features, to such apparatus for photographic projection and analogous uses.

Among the several objects of the invention may be noted the provision of sheet locating and masking apparatus, for photographic and analogous uses, adapted to register photographic paper or the like in predetermined positions according to either of two different bordering conditions; the provision of apparatus of the class described which with a single set of simple framing elements can conveniently be arranged for use according to either of said conditions, as required; and the provision of apparatus of the class described which is of low cost, convenient to operate and which may be compactly stored. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claim.

In the accompanying scaled drawings, in which one of various possible embodiments of the invention is illustrated, FIG. 1 is a top plan view illustrating a typical one of a set of similar framing guide bars constituting the invention;

FIG. 2 is a bottom plan view of FIG. 1;

FIG. 3 is an enlarged cross section taken on line 3—3 of FIG. 1;

FIG. 4 is an enlarged longitudinal section taken on line 4—4 of FIG. 1;

FIG. 5 is a plan view showing the application of the invention for locating and framing a sheet for border masking;

FIG. 6 is a view similar to FIG. 5 but showing the application of the invention for locating and framing a sheet which is to be borderless;

FIG. 7 is an enlarged cross section taken on line 7—7 of FIG. 5, the paper shown in FIG. 5 being omitted;

FIG. 8 is an enlarged cross section taken on line 8—8 of FIG. 6, the paper shown in FIG. 6 being omitted;

Corresponding reference characters indicate corresponding parts throughout the several views of the drawings.

Figure 9:
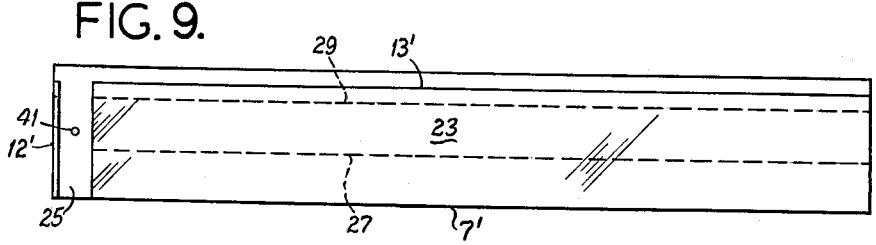
FIG. 9 is a top plan view illustrating another form of bar constituting part of the invention.

While the invention has general application, its primary one is to locate or position photographic sheets for printing under photographic projectors, and it is in connection with such use that it will for example be described herein; but it is to be understood that analogous uses are contemplated.

Referring now more particularly to the drawings, there are shown at numerals 1, 2, 3 and 4 (FIG. 5) locating framing bars for a sheet, such as a sensitized photographic sheet 5 to be operated upon under the usual suitable safe light. The sheet 5 is intended to be located by the bars 1, 2, 3, 4 either to be masked along its margins, as illustrated in FIG. 5, or to be so located without masking, as illustrated in FIG. 6. All of the bars 1, 2, 3, 4 are of the same construction except that one pair of them, such as 1 and 3, are preferably of equal shorter lengths than equal longer lengths of the other pair 2 and 4. Thus the typical form of each bar is illustrated in FIGS. 1–4, wherein bar 1 has been selected for detailed description which will apply to all bars, except for length.

The bar 1 has opposite parallel edges 7 and 9. Edge 7 is preferably flat, formed as an abutment for paper edges, the bar having a sufficient thickness 11 that abutment will be accurate and convenient, whether or not the sheet of paper is absolutely flat or somewhat wrinkled or curled. An example of a suitable thickness is one-eighth inch as indicated at 11. The edge 7 runs from one end 10 to an opposite end 12 of the bar. The edge 9 is recessed on its underside by means of a groove such as shown at 13, which also extends from end 10 to end 12 of the bar. The depth of the groove 13 parallel to the plane of the bar 1 is equal to the amount of margin that it may be desirable to have masked around the edge of the paper sheet 5 against whatever operation may be performed upon the sheet, such as photographic projection.

At numeral 15 is a transverse guide member which at 17 is welded to the bar 1, although it is to be understood that means other than welding may be employed in this connection at this point. Thus bar 1 and the guide member 15 might be integral in the region at 17. In any event, the guide member 15, which extends at a right angle transversely to the length of bar 1, carries a downward rib 19 located opposite the end 12 of the bar 1 and parallel therewith. This is to form at the end of each bar a guide 15 having a downwardly open U-shape, as shown in FIG. 4, forming an opening 21. The distance between the downward rib 19 and the bar end 12 results in the opening 21 such as to admit another one of the bars for sliding cooperation in the U-shape. While the guide member 15 has the form of a T head, such a shape is not absolutely necessary to its function as a transverse guide means of the type described. It will also be understood that while the rib 19 is continuous, it might have other forms such as a line of projections or the like, which again in effect would provide the downwardly open U-shape for guide purposes.

Referring to FIG. 5, there is illustrated the use of a complete set of bars 1, 2, 3, 4 for positioning and framing a photographic sheet 5 so that it will have a masked border. Thus transverse guide 15 of bar 2 is applied to bar 1, so that the grooves 13 are on the inside of the angle formed between these bars 1 and 2. Guides 15 of bars 3, 4 and 1 are likewise applied to bars 2, 3 and 4, respectively, with their grooves 13 also on the insides of the angles formed between bars (2, 3), (3, 4) and (4, 1). After this has been done, the flat bottoms of all bars become coplanar on the supporting surface with their masking grooves 13 inside of the flat frame thus formed. The bars may then be adjusted to parallel positions such that a rectangular frame will be formed of proper size and in a desired location to receive the size of paper 5 then in use. In order to position the paper under the bars 1, 2, 3, 4, they are slid into position determining an inside rectangle larger than the paper. Then one corner of the paper is pushed into the adjacent grooves of two of the bars at one corner between them, and its adjacent margins placed under the adjacent grooves of these bars. Then the other two bars are slid inward to positions in which their grooves cover the other paper margins. Upon projection and development of any picture projected on the paper, the paper will have an appropriate blank margin equal to the width of the grooves 13.

FIG. 7 illustrates at one corner how, according to FIG. 5, bar 1 is located slidably in the space 21 and under overlying guide 15 on the end of bar 2. This results in the grooves 13 of bars 1 and 2 being in communication at 6 (FIG. 7) so that a corner of the paper sheet 5 may be accommodated at the junction between bars 1 and 2.

In FIG. 6 is illustrated how the same set of bars 1, 2, 3, 4 may alternatively be rearranged to frame the sheet of paper 5 with marginal abutment for borderless operation. This is accomplished by reversing the position through 180° of each guide member 15 on its respective bar, so that the right-angular extension of each bar from the one on which it slides becomes reversed and opposite. This can be seen by comparing the extensions in FIG. 5 of the bars 1, 2, 3, 4 from their bars 4, 1, 2, 3, respectively, with the reversed extensions in FIG. 6 of the bars 1, 2, 3, 4 from bars 4, 1, 2, 3, respectively. It will be noted that the sequence of bars 1, 2, 3, 4 in FIG. 5 is clockwise and in FIG. 6 it is anticlockwise. This rule simplifies setting up the bars for either condition of operation and for this purpose the four bars may be suitably identified, as by imprinting on them the numbers 1, 2, 3, 4, respectively. Thus, each bar extends in FIG. 5 at right angles to its adjacent bar and from its grooved edge, but in FIG. 6 each bar extends at right angles to its adjacent bar from its ungrooved edge. This places the masking grooves 13 outward and the ungrooved edges 7 inward, providing an adjustable rectangular pocket of depth equal to thickness 11 forming a well. The rectangular form is then adjusted for reception of the sheet of paper 5 to be printed without masking.

The set of bars 1, 2, 3, 4 may be adjusted relative to one another in either of the FIG. 5 or FIG. 6 arrangements, to make up paper-framing rectangles of dimensions adapted to receive any size of paper within the scope of the bar lengths.

Although the described form of the invention is deemed the most desirable, wherein one margin such as 7 of each bar 1, 2, 3, 4 is of the abutment type, it will be understood that this margin might also be formed as an additional groove of different depth than groove 13, so that by changing the positions of the bars as illustrated in FIGS. 5 and 6, two different degrees of overlap of the margins of paper 5 might be obtained. Also, any grooved bar margin may be formed other than straight, as for example wavy, toothed or the like, to produce other than straight-line masking, if desired. Any such wavy or toothed form should, however, be selected so as not to interfere with guided movements through spaces 21, as by making small the pitch distances between waves or teeth.

In view of the above, various advantages of the invention will be apparent, among which are the following:

(1) Except for their different paired lengths, all bars and their associated guides 15 are of the same construction, which minimizes manufacturing costs.

(2) Changing the arrangements between bars as shown in FIGS. 5 and 6 is accomplished simply by reversing the aspects of the guides 15 on the adjacent bars and following the sequence rule above stated, thus conveniently providing for use either with or without masking and bordering of the sheet 5.

(3) The guides 15, being open at space 21 and not forming complete telescoping surrounds on the bars with which they cooperate, are adapted for easy separation of each bar from the other by simple lifting movements, rather than movements of the guides from the bar ends such as would be required by surrounds. Such surrounds would also prevent the flat bottoms of the bars from resting flush on their supporting surface.

(4) Because of the convenient separation referred to under (3) above, the bars may be disassembled at the end of a work period and stacked flatwise, one upon the other, to form a compact bundle for convenient storage in a small space. In such bundles they may also be compactly boxed for shipment upon sale.

In FIGS. 9–18 is shown another form of the invention providing for additional masking widths available. In this form of the invention, the guides at the end of the bars are made detachable so that they and the bars may be relatively inverted to make available two additional masking grooves of additional widths.

Figure 10:
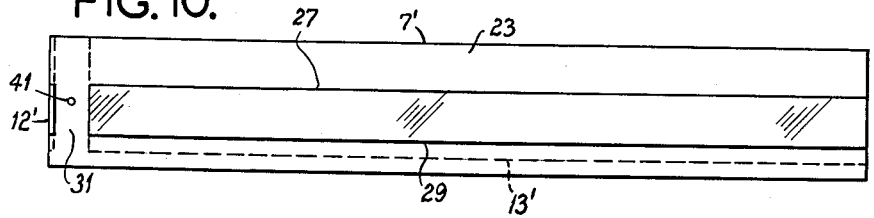
FIG. 10 is a bottom plan view of FIG. 9.
Figure 11:
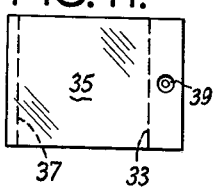
FIG. 11 is a top plan view of an alternative form of guide for use with the bar shown in FIGS. 9 and 10.
Figure 12:
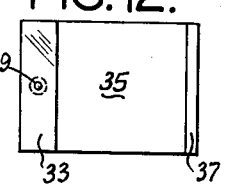
FIG. 12 is a bottom plan view of FIG. 11.
Figure 13:
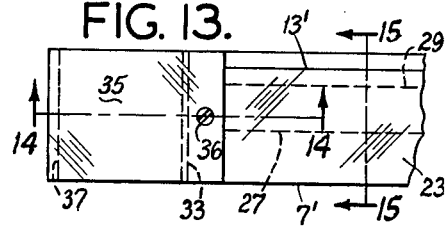
FIG. 13 is a plan view showing one type of assembly of the bar and guide shown in FIGS. 9–12.
Figure 14:
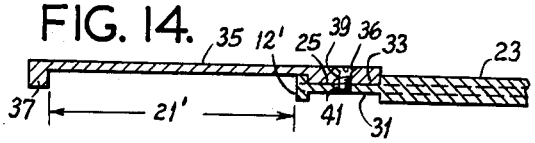
FIG. 14 is an enlarged axial section taken on line 14—14 of FIG. 13.
Figure 15:
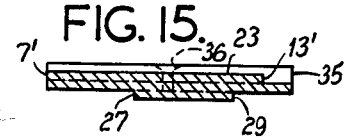
FIG. 15 is an enlarged cross section taken on line 15—15 of FIG. 13.

Referring to FIGS. 9 and 10, each modified bar is numbered 23 and has on one side of it a groove 13' like groove 13 already described. On this same side and opposite this groove 13' is an abutment edge 7', similar to but shallower than the edge 7 of the FIGS. 1–8 form. At the end of the same side, the bar 23 is provided with a cross groove 25.

Referring to FIG. 10, the other side of the bar 23 is provided on one margin with a groove 27 which is wider than groove 13'. Groove 27 accounts for abutment 7' being shallower than abutment 7 of FIGS. 1–8. On its opposite margin the bar 23 is provided with a groove 29 which is intermediate in width between the grooves 13' and 27. Another endwise cross groove 31 is provided on this side of the bar (FIG. 10) which is in the same plane as the endwise cross groove 25 on its other side (FIG. 9).

The purposes of the grooves 25 and 31 are alternatively to receive a tongue 33 of a U-shaped guide member 35. Opposite the tongue 33 on guide member 35 is a rib 37. A hole 39 is provided in guide 35 through tongue 33 for the reception of a screw 36, adapted to be turned into a threaded opening 41 extending between endwise grooves 25 and 31 of the bar.

Figure 16:
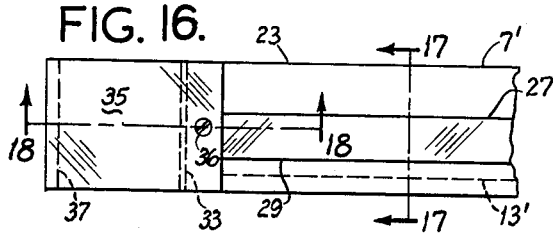
FIG. 16 is a plan view showing another type of assembly of the bar and guide shown in FIGS. 9–12.
Figure 17:
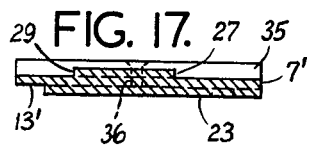
FIG. 17 is an enlarged cross section taken on line 17—17 of FIG. 16.
Figure 18:
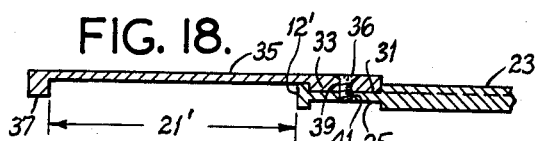
FIG. 18 is an enlarged axial section taken on line 18—18 of FIG. 16.

In view of the above, it will be seen from FIGS. 13–18 that the guide 35 may be relatively invertibly attached to bar 23 either by organizing tongue 33 with groove 25 (FIGS. 13–15) or groove 31 (FIGS. 16–18). Thus with a given position of the guide 35, there is provided an underlying space 21' between the end 12' of any bar and the rib 37 for either inverted position of the respective bar. Thus in FIGS. 13–15, a guide 35 is attached to typical bar 23 with both of the deeper grooves 27 and 29 in underlying position. In FIGS. 16–18, a guide 35 is attached to typical bar 23 with the shallower groove 13' underlying the bar, and the shallower abutment 7' beneath groove 27 being on the other side of the bar. In this case the abutment is not as deep as the abutment shown in FIGS. 1–6 because groove 27 has cut away the upper portions of the same. Nevertheless, it is of sufficient height for abutment purposes for paper or the like. For interchanging the relationship between guide 35 and bar 23, the screw 36 is removed and tongue 33 invertibly interchanged in grooves 25 and 31.

The four bars may be arranged relative to their guides 35 with the grooves 27 and 29 down and groove 13' up (FIG. 13); or with groove 13' and abutment 7' down and grooves 27 and 29 up (FIG. 16). In either case, the sequences of the applications of the guides to the bars may be reversed, as illustrated in FIGS. 5 and 6. When reversed in the FIG. 13 aspect, a selection for inside masking by grooves 27 or 29 is available, and when reversed in the FIG. 16 aspect, a selection for inside masking by groove 13' or inside abutment by 7' may be had.

The added advantage of the alternate form of the invention is the provision of more than one depth of groove for masking purposes. It will be understood that, if desired, four grooves without the abutting feature could be employed by employing an additional groove on each bar 23 on its side opposite groove 27, thus eliminating the abutment 7'. In such a case, a selection of any one of four masking depths might be had, but without the abutment feature.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

Sheet locating and masking apparatus comprising a set of four bars substantially identical in form except possibly as to length, each of which bars has opposite faces and parallel corner-forming margins, each corner of each margin of each bar being formed for a different type of sheet engagement, at least some of which corner-forming margins are recessed to receive therein edges of paper sheets to be marginally masked, slide means at one end of each bar adapted for sliding engagement with any other bar of the set in either of two opposite right-angular arrangements with respect thereto, whereby either set of bar edges on a margin may be presented inwardly by selecting one or another of said right-angular arrangements for all bars upon assembly, and whereby either of one set of corners of a set of inwardly presented edges may be presented to the paper.

References Cited in the file of this patent

UNITED STATES PATENTS

| | | |
|---|---|---|
| 963,940 | Ray | July 12, 1910 |
| 1,116,888 | Heyn | Nov. 10, 1914 |
| 1,183,977 | Hoefle | May 23, 1916 |
| 1,360,507 | Douglas | Nov. 30, 1920 |
| 1,630,414 | Baier | May 31, 1927 |
| 1,811,123 | Glaser | June 23, 1931 |
| 1,863,236 | Brienza | June 14, 1932 |
| 2,250,309 | Lary | July 22, 1941 |